US011210286B2

(12) United States Patent
Yazdani et al.

(10) Patent No.: US 11,210,286 B2
(45) Date of Patent: Dec. 28, 2021

(54) FACET-BASED CONVERSATIONAL SEARCH

(71) Applicant: Microsoft Technology Licensing, LLC, Redmond, WA (US)

(72) Inventors: Majid Yazdani, Ranelagh (IE); Alexander Chiocchi, Sunnyvale, CA (US); Craig Martell, Sunnyvale, CA (US); Muhieddine El Kaissi, Dublin, CA (US); Xiao Bao, Marina Del Rey, CA (US); Sanjay Kshetramade, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 45 days.

(21) Appl. No.: 15/939,824

(22) Filed: Mar. 29, 2018

(65) Prior Publication Data

US 2019/0205445 A1 Jul. 4, 2019

Related U.S. Application Data

(60) Provisional application No. 62/611,344, filed on Dec. 28, 2017.

(51) Int. Cl.
*G06F 16/242* (2019.01)
*G06F 16/951* (2019.01)
*G06F 16/248* (2019.01)
*G06F 16/25* (2019.01)

(52) U.S. Cl.
CPC ........ *G06F 16/2425* (2019.01); *G06F 16/243* (2019.01); *G06F 16/248* (2019.01); *G06F 16/252* (2019.01); *G06F 16/951* (2019.01)

(58) Field of Classification Search
CPC combination set(s) only.
See application file for complete search history.

(56) References Cited

U.S. PATENT DOCUMENTS

| 9,183,257 | B1 | 11/2015 | Buchanan et al. |
| 9,811,592 | B1 | 11/2017 | Bakir et al. |
| 2007/0266002 | A1* | 11/2007 | Chowdhury ........ G06F 16/3326 |
| 2012/0226681 | A1 | 9/2012 | Paparizos et al. |

(Continued)

OTHER PUBLICATIONS

"Non Final Office Action Issued in U.S. Appl. No. 15/939,908", dated Jan. 13, 2020, 12 Pages.

(Continued)

*Primary Examiner* — Van H Oberly
(74) *Attorney, Agent, or Firm* — NDWE, LLP (57) ABSTRACT

A method is provided. The method comprises receiving a search query that is part of a search conversation, the search query in an unstructured format; identifying a first list of facets with a first list of associated values from the search query; deriving a second list of facets with a second list of associated values from the first list of facets based on a context of the search query within the search conversation; generating a database query based on the second list of facets with the second list of associated values; causing a database search with the database query; transmitting a search result of the database search to a sender of the search query, wherein the method is performed by one or more computing devices.

17 Claims, 7 Drawing Sheets

(56) References Cited

U.S. PATENT DOCUMENTS

| | | | | |
|---|---|---|---|---|
| 2014/0006012 A1* | 1/2014 | Zhou | ................... | G06F 16/3344 |
| | | | | 704/9 |
| 2014/0351267 A1* | 11/2014 | Kumar | ................ | G06F 16/3334 |
| | | | | 707/748 |
| 2015/0120717 A1* | 4/2015 | Kim | ...................... | G06F 16/335 |
| | | | | 707/727 |
| 2016/0026643 A1 | 1/2016 | Desai et al. | | |
| 2016/0140228 A1* | 5/2016 | Cohen | ................... | G06F 16/951 |
| | | | | 707/708 |
| 2017/0025120 A1* | 1/2017 | Dayan | ................. | G06F 16/3335 |
| 2017/0098159 A1 | 4/2017 | Sharifi et al. | | |
| 2017/0124091 A1 | 5/2017 | Nowak-przygodzki et al. | | |
| 2017/0161262 A1* | 6/2017 | Bhatt | ................... | G06F 40/279 |
| 2018/0089332 A1* | 3/2018 | DeLuca | ................ | G06F 40/274 |
| 2018/0189417 A1 | 7/2018 | Freed et al. | | |
| 2018/0285444 A1 | 10/2018 | Joshi et al. | | |
| 2018/0300395 A1* | 10/2018 | Weinstein | ........... | G06F 16/3344 |

OTHER PUBLICATIONS

"Final Office Action Issued in U.S. Appl. No. 15/939,908", dated Jun. 12, 2020, 11 Pages.

"Non Final Office Action Issued in U.S. Appl. No. 15/939,908", dated Dec. 14, 2020, 13 Pages.

"Final Office Action Issued in U.S. Appl. No. 15/939,908", dated Apr. 28, 2021, 18 Pages.

"Non Final Office Action Issued in U.S. Appl. No. 15/939,908", dated Nov. 1, 2021, 18 Pages.

\* cited by examiner

FACET-BASED CONVERSATIONAL SEARCH

BENEFIT CLAIM

This application claims the benefit under 35 U.S.C. § 119(e) of provisional application 62/611,344, filed Dec. 28, 2017, the entire contents of which is hereby incorporated by reference for all purposes as if fully set forth herein. The applicants hereby rescind any disclaimer of claim scope in the parent applications or the prosecution history thereof and advise the USPTO that the claims in this application may be broader than any claim in the parent applications.

TECHNICAL FIELD

The present disclosure relates to enabling accurate database searching based on natural-language queries, and more specifically to automatically identifying and predicting facets involved in a conversational search.

BACKGROUND

As more digital information becomes available, it becomes more difficult to find the desired digital information. Many tools have been created to facilitate a search of digital information. It would be helpful to further reduce the amount of user effort required in such a search while increasing the accuracy of the search result.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A conversational search server (the "server" hereinafter) and related methods for converting a series of non-structured search queries into effective database queries are disclosed. Today's databases can store a large amount of data, which can be organized and transformed into useful information. In many cases, the more information is included in a description of an item, the more accurate the description is likely to be. Having to manage many types of data or information can be a challenge for a user, though. For example, a database management system ("DBMS") in the recruiting or resource management industry can have core databases storing data related to different entities, such as employers, employees, candidates, recruiters, positions, job histories, work relationships, hiring practices, market trends, or other entities represented in LinkedIn Economic Graph, for example. Each entity can be represented by many attributes or facets, such as the name or location of the employer or the required skills of a job. It can then be difficult to manage these facets in mentally formulating a search query, one that will find the right candidates for an employer, for instance. Conventional computer tools may facilitate such formulation by presenting a list of specific facets, for which the user can then provide values. However, the sheer number of available facets often renders the display of these facets ineffective, especially when the screen is small, such as one in a mobile device.

In some embodiments, the server is programmed to enable a user to provide a search query in a user-friendly form, such as by simply stating what the user thinks he or she is looking for. The server is then programmed to convert the search query into a form that can be understood by a database search engine or a database server within a DBMS. In addition, the server is programmed to engage in a search conversation (or equivalently "a conversational search" or a "session") with a user computer by maintaining a context through a series of search queries, each submitted after the search result of the previous search query is returned.

In some embodiments, a search query can be in one of several forms, such as a natural language sentence alone or in combination with separate keywords or specific facet-value pairs. In one example, the present search query can be "Find people working at deep mind in Canada and Australia". The server is then programmed to convert the search query by identifying a first set of facets from the search query, such as by extracting words or phrases from the search query, comparing the words or phrases with the data in the core databases or dictionaries, or running the words or phrases through a linguistic model. In the example, the first set of facets may contain a first facet of "company" with an associated value of "deep", a second facet of "company" with an associated value of "mind", a third facet of "company" with an associated value of "deep mind", a fourth facet of "location" with an associated value of "Canada", and a fifth facet of "location" with an associated value of "Australia".

A search query in a search conversation may be concise or partial because additional information is contained in previous search queries and this search query is a follow-up. In some embodiments, the server is programmed to further refine the first set of facets into a second set of facets, based on the context of the search query within the search conversation. Specifically, the server is programmed to determine whether to add a facet, to drop or modify one of the second set of facets, and so on. In the example, the next search query in the search conversation may be "Only in Montreal". The first set of facets in this case can consist of the facet of "location" with an associated value of "Montreal". By considering the previous search query, however, the second set of facets can be obtained by supplementing the first set of facets with the facet of "company" with an associated value of "Deep Mind", but not the facet of "location" with an associated value of "Canada".

In some embodiments, the server is programmed to refine the second set of facets into a third set of facets that are "coherent" or substantially likely to lead to a meaningful database search. Such refinement can be based on a search history of prior search queries provided by a certain group of users, or specifically a search log of facet-value pairs corresponding to prior search queries. Such refinement can also be based on additional facts or data in the core databases or external systems. In the example, the second set of facets may retain the third facet of "company" with an associated value of "Deep Mind" and a fourth facet of "location" with an associated value of "Canada" because "Deep Mind" is the name of an actual company and it has offices in Canada but not in Australia.

In some embodiments, the server is programmed to identify one or more facets that can be included in the next search query based on the context or the set of prior search queries. In the example, when the search history indicates that the search query of "Only in Montreal" is often followed by "In a particular building" or "Consider Vancouver as well", a prediction or suggestion for what to be included in the next search query can be a facet of "building" (without an associated value because prior search queries have covered different values) or a facet of "location" with an associated value of Vancouver.

The server offers several technical benefits. The server reduces computing requirements. Fewer facets now need to be displayed or otherwise managed through a user interface but can be automatically inferred. In addition, fewer and simpler search queries may be received from a user computer, further reducing network traffic and memory usage. In addition, the server increases the quality of search results. The refined and inferred facets tend to better characterize the intent behind the original search query. Furthermore, the server improves computer usability. The server allows a user to issue search queries using natural language, instead of having to remember various facets or deal with a crowded user interface presentation. The server further allows the user to incrementally change or otherwise adapt their search queries, instead of having only one shot at formulating a search query or having to start from scratch.

Example Computing Environment

Figure 1:
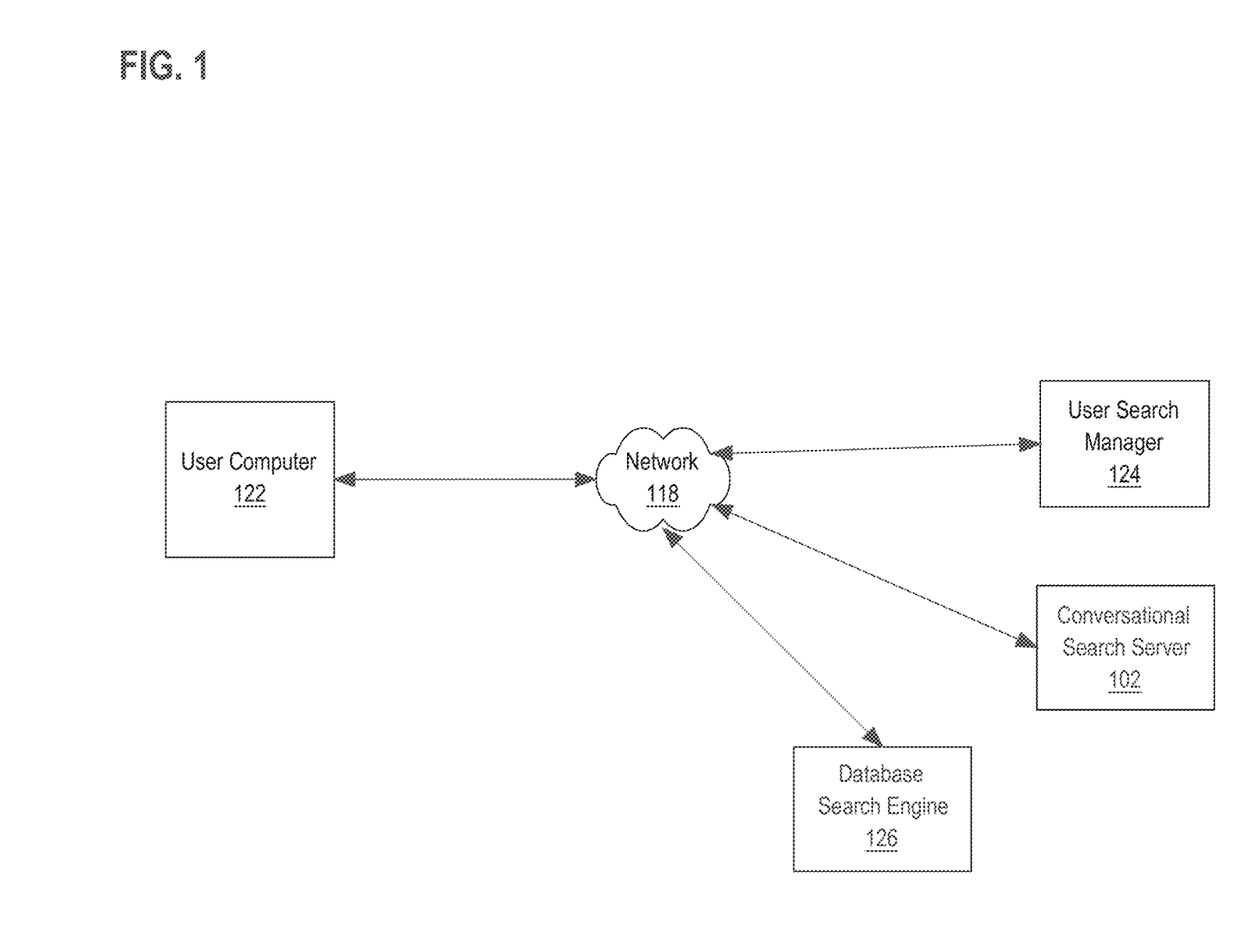
FIG. 1 illustrates an example networked computer system in which various embodiments may be practiced.

FIG. 1 illustrates an example networked computer system in which various embodiments may be practiced. FIG. 1 is shown in simplified, schematic format for purposes of illustrating a clear example and other embodiments may include more, fewer, or different elements connected in various manners.

In some embodiments, the networked computer system comprises a user search manager 124, a conversational search server 102, a database search engine 126, and one or more user computers 122, which are communicatively coupled directly or indirectly via one or more networks 118. The different components of the networked computer system can reside in the same or different computer network domains.

In some embodiments, the server 102 is programmed to process a search query provided by a user and generate a corresponding database query. The server 102 broadly represents one or more computers, virtual computing instances, and/or instances of a server-based application that is programmed or configured with data structures and/or database records that are arranged to host or execute functions of a conversational search server including but not limited to automatically determining and predicting facets involved in a conversational search. The server 102 can comprise a server farm, a cloud computing platform, a parallel computer, or any other computing facility with sufficient computing power in data processing, data storage, and network communication for the above-described functions.

In some embodiments, a user computer 122 is programmed to transmit a search query and receive a search result in response to the search query. The user computer 122 may comprise a desktop computer, laptop computer, tablet computer, smartphone, wearable device, or any other type of computing device that is capable of proper communication with the server 102 as well as adequate local data presentation, processing, and storage.

In some embodiments, the user search manager 124 is programmed to receive a search query provided by a user and return a search result in response to the search query. The database search engine 126 is programmed to receive a database query, search one or more databases using the database query, and return a search result in response to the database query.

The networks 118 may be implemented by any medium or mechanism that provides for the exchange of data between the various elements of FIG. 1. Examples of network 118 include, without limitation, one or more of a cellular network, communicatively coupled with a data connection to the computing devices over a cellular antenna, a near-field communication (NFC) network, a Local Area Network (LAN), a Wide Area Network (WAN), the Internet, a terrestrial or satellite link, etc.

In some embodiments, a user computer 122 is programmed to send a search query to the user search manager 124. The user search manager 124 is programmed to receive the search query from the user computer 122 and send the search query to the server 102. The server 102 is programmed to receive the search query from the user search manager 124, generate a database query, and transmit the database query to the database search engine 126. The database search engine is programmed to receive the database query from the server 102 and return a search result to the server 102, which can be programmed to return the search result to the user search manager 124, which can be programmed to return data related to the search result to the user computer 122.

In some embodiments, the server 102 is programmed to further generate a prediction or suggestion for what type of information to include in the next search query and transmit the prediction or suggestion to the user search manager 124, which can be programmed to return the prediction or suggestion to the user computer 122.

In some embodiments, any of the server 102, the user search manager 124, and the database search engine 126 can be integrated into a single system.

Example Components

Figure 2:
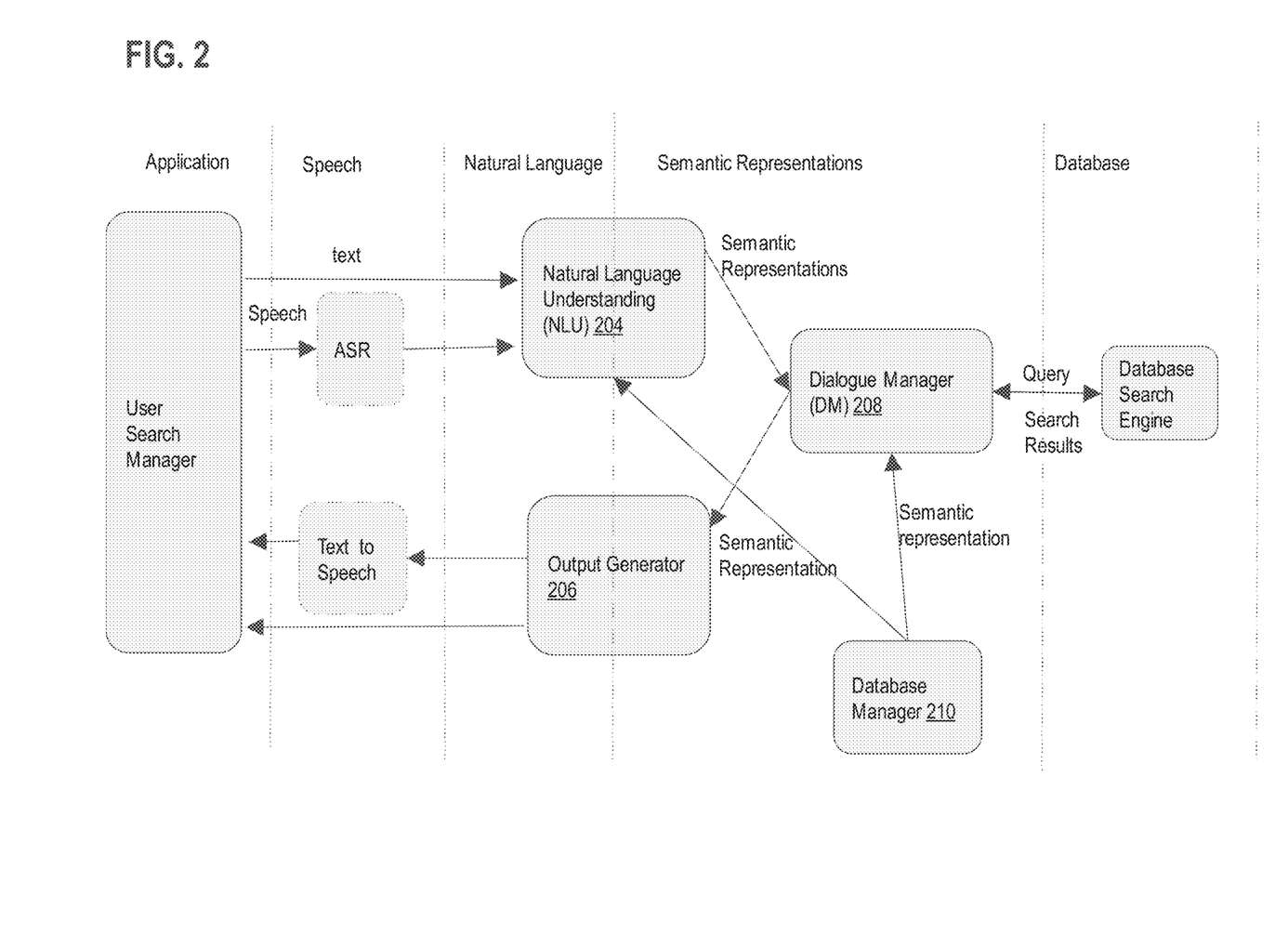
FIG. 2 illustrates an example conversational search server.

FIG. 2 illustrates example components of a conversational search server. FIG. 2 is shown in simplified, schematic format for purposes of illustrating a clear example and other embodiments may include more, fewer, or different elements connected in various manners.

In some embodiments, the server 102 comprises a national language understanding ("NLU") unit 204, a dialogue manager 208, a database manager 210, and an output generator 206.

In some embodiments, the server 102 is programmed to receive a search query provided by a user. The search query can be received initially by the user search manager 124. The user search manger can be a web server, for example, that is programmed to cause display of a graphical user interface ("GUI"). The interface may have fields that allow a user to provide a search query, such as a natural-language sentence, keywords, or values for specific facets. The search query can be provided in various forms, such as speech or text.

When the search query is in the speech form, the server 102 can additionally be programmed to communicate with an automatic speech recognition ("ASR") tool, such as one known to someone with ordinary skill in the art, that would convert speech to text. The ASR could also be incorporated into the user search manager 124.

In some embodiments, the server 102 or specifically the NLU unit 204 is programmed to receive a search query in the text form from the user search manager 124 or the ASR tool. The NLU unit 204 is programmed to map the search query to semantic representations that can be consumed by machines effortlessly. One such semantic representation is a database query that can be executed by the database search engine 126 or a preliminary form, such as a set of facet-value pairs together with certain Boolean operators, leading to a database query.

In some embodiments, the NLU unit 204 is programmed to build a linguistic model that represents a search query. The linguistic model can factor in grammars, semantics, or other linguistic features to parse a natural language search query into useful parts. One use of the linguistic model is to recognize words or sounds that correspond to utterances that indicate mood or intent without actually forming part of the search query. For example, the word "hmmm" may indicate hesitation, and the phrase "that's all" or "thank you" may indicate an intent to finish the current search conversation. Another use of the linguistic model is to identify facets that can form a search query. For example, the word "Canada" is associated with a facet of "location", and the words "people working at" may be associated with a facet of "employee". As further discussed below, the facet of "employee" corresponds to an item to be looked for, while the facet of "location" corresponds to an attribute of an item to be looked for. In other embodiments, the NLU unit 204 is programmed to implement at least a portion of facet tagging, action tagging, and/or coherence scoring, as further discussed below. Performance of each of these tasks can utilize the linguistic model built by the NLU unit 204 or received from another source as well as other types of data, such as dictionaries, search histories of search queries provided by various users, search logs of facet-value pairs which might corresponding to the search queries, or user profiles.

In some embodiments, the dialogue manager 208 is programmed to maintain context details for a search conversation, in which a user computer 122 submits a search query, the server 120 returns a search result in response to the search query, the user computer 122 submits another search query in response to the search result, and so on. For each search conversation, the dialogue manager 208 can be programmed to track the series of search queries, the corresponding sets of facet-value values, or the corresponding user feedback, as further discussed below. In other embodiments, the dialogue manager 208 is programmed to implement at least a portion of action tagging and facet prediction, as further discussed below. In yet other embodiments, certain tasks that can be performed by the NLU 204 can be performed by the dialogue manager 208, and vice versa.

In some embodiments, the database manager 210 is programmed to manage various types of data related to the process of converting a user-provided search query to a database query. Some examples include a comprehensive list of facets corresponding to the core databases, one or more dictionaries, digital representations (including computer-executable instructions) of linguistic models for analyzing search queries, different lists of facet-value pairs corresponding to one or more search queries, context information related to a search conversation including one or more search queries, a list of actions applicable to facets, search histories of search queries provided by various users, search logs of facet-value pairs corresponding to the search queries or input separately, user profiles, training data for the facet tagging model, action tagging model, coherence scoring model, and face prediction model, and digital representations of these models, as further discussed below. In addition to the search queries received via direction submission to the serer 102, additional actual or plausible unstructured queries received from another system can be managed by the database manager 210. Similarly, in addition to the search logs derived from the search queries received via direct submission to the server 102, additional facet-value pairs that correspond to actual or plausible unstructured queries received from another system can be managed by the database manager 210.

In some embodiments, the dialogue manager 208 (or the NLU unit 204) is programmed to submit a database query to the database search engine 126. The database search engine 126 is programmed to execute the database query against the core databases, generate a search result, and transmit the search result to the dialogue manager 208. In other embodiments, the database search engine 126 can be integrated with the database manger 210.

In other embodiments, the dialogue manager 208 or the NLU unit 204 is programmed to transmit the search result to the output generator 206. The output generator 206 is configured determine whether and how to transform the search result to a user-friendly form. The search result typically includes a set of database records. For example, a record in an employee database can comprise multiple facet-value pairs, such as a facet of "name" with an associated value of "John Smith" and a facet of "gender" with an associated value of "Male". The output generator 206 can be programmed to present the record in a natural language sentence. The output generator 206 can also be programmed to generate a graphical representation of the search result. In addition, the output generator 206 can be programmed to filter the search result to include only the portions of interest to the user who provided the search query. In other embodiments, the output generator 206 can communicate with a text-to-speech unit, such as one known to someone skilled in the art, to convert the search result back to speech. The text-to-speech unit is then programmed to transmit the improved search result in the user-friendly form back to the user search manager 124. The text-to-speech unit can also be integrated into the user search manager 124.

In some embodiments, the server 102 is programmed to incorporate additional user feedback into the process. The output generator 206 can be programmed to transmit one or more of the different sets of facet-value pairs generated from one search query, to the user search manager 124, all at once, once each is available, or according to a user choice. For example, in response to a natural-language search query provided by a user, a first set of facet-value pairs is generated through facet tagging and can be displayed to the user. In response, the user may indicate certain changes to the first set of facet-value pairs. The user search manger 124 can be programmed to transmit such user feedback back to the NLU unit 204, which together with the dialogue manager 208 can be programmed to use the updated set of facet-value pairs for downstream processing.

Example Processes

Figure 3:
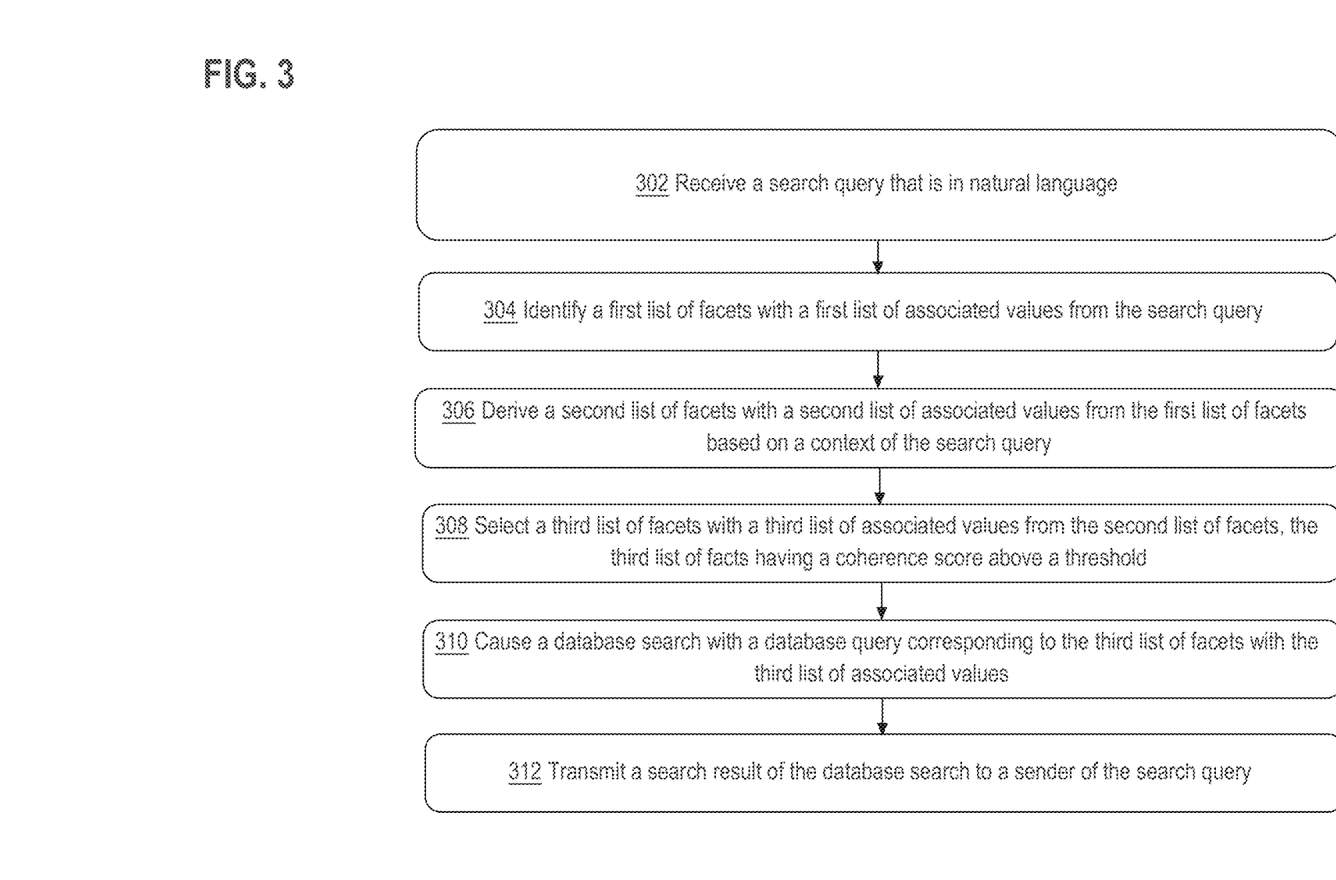
FIG. 3 illustrates an example process performed by the conversational search server.

FIG. 3 illustrates an example process performed by the conversational search server. FIG. 3 is shown in simplified, schematic format for purposes of illustrating a clear example and other embodiments may include more, fewer, or different elements connected in various manners. FIG. 3 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, the server 102 is programmed to initially create embeddings for words or phrases that are likely to appear in search queries or be associated with the words in the search queries, which can facilitate downstream processing in facet tagging, action tagging, or coherence scoring. The results of downstream processing can also be backpropagated to embedding creation to improve the embeddings. Different words or phrases in a given vocabulary appear (or do not appear) in search queries in different manners depending on the specific domain or industry. Instead of using one-hot vectors where each dimension corresponds to a word or phrase in the vocabulary, the server 102 is programmed to represent the words or phrases with low-dimensional vectors such that two of these vectors are closer together in the new vector space when they represent similar words or phrases. The creation of embeddings can be performed by building one or more neural networks or utilizing other techniques known to someone skilled in the art. The creation of embeddings can be performed in a supervised manner using search histories, search logs, or other actual or plausible unstructured queries or facet-value pairs, in an unsupervised manner using huge amounts of unannotated texts, or a combination of both, such as using the result of the unsupervised process to initialize the supervised process. The created embeddings can be saved in an embedding table and looked up for the words or phrases that appear in search queries in a new search conversation.

In step 302, the server 102 is programmed with data structures and/or database records that are arranged to receive a search query that includes natural language, typically from the user search manager 124. For example, the search query can be a natural language phrase or sentence alone or in combination with separate keywords or specific facet-value pairs. The search query can be part of a search conversation, where each of a series of search queries follows a search result in response to the previous search query.

In step 304, the server 102 is programmed to perform facet tagging. In some embodiments, the facet tagging can include executing a facet tagging model that takes a natural-language or otherwise unstructured search query as input and produces a first list of facet-value pairs as output. Specifically, the server 102 is programmed to identify portions of the search query that correspond to facets or their associated values. In the example given above, when the search query is "Find people working at deep mind in Canada and Australia", the server 102 can be programmed to recognize that "people" or "people working at" corresponds to "person" as one of the list of predefined facets without an associated value in the search query. The server 102 through the facet tagging model or another component can be further programmed to determine that the facet of "person" corresponds to the "employee" database (or specifically the "name" field as primary key, for example), or that the facet corresponds to the item to be looked for instead of an attribute of the item. Similarly, the server 102 may be programmed to recognize that "Deep Mind", "Canada", and "Australia" correspond to "company", "location", and "location" as predefined facets with their associated values. For "Deep Mind", for example, the server 102 through the facet tagging model or another component can be further programmed to determine that the facet corresponds to the "employer" field of the "employee" database or that the facet corresponds to an attribute of the item to be looked for.

In some embodiments, the server 102 is programmed to further determine domain-specific relationships. In the recruiting or resource management industry, for example, some of the search queries may concern a candidate's employment history. The server 102 can thus be programmed to recognize that certain words or phrases in the search query, such as "worked before", "used to work", or "previous job", can correspond to specific facets related to employment history, such as the "prior company" field or the combination of the "company" and "time of employment" fields of the employee database.

In some embodiments, the facet tagging model can be trained with machine learning techniques using search histories of prior search queries, synthetic natural-language queries derived from search logs of facet-value pairs or input separately, or other actual or plausible unstructured queries, which correspond to the model input. The facet tagging model can be further trained with the facet-value pairs that can be extracted from those unstructured queries, which correspond to the model output. The training or execution of the facet tagging model can utilize the initially computed embeddings to represent the unstructured queries (e.g., embeddings for the words or phrases in an unstructured query) or facet-value pairs (e.g., embeddings for the facets). As more unstructured queries and corresponding facet-value pairs become available, the facet tagging model can be retrained. Such retraining can occur periodically, upon specific request, or when the number of new unstructured queries available for training reaches a certain threshold.

Figure 4:
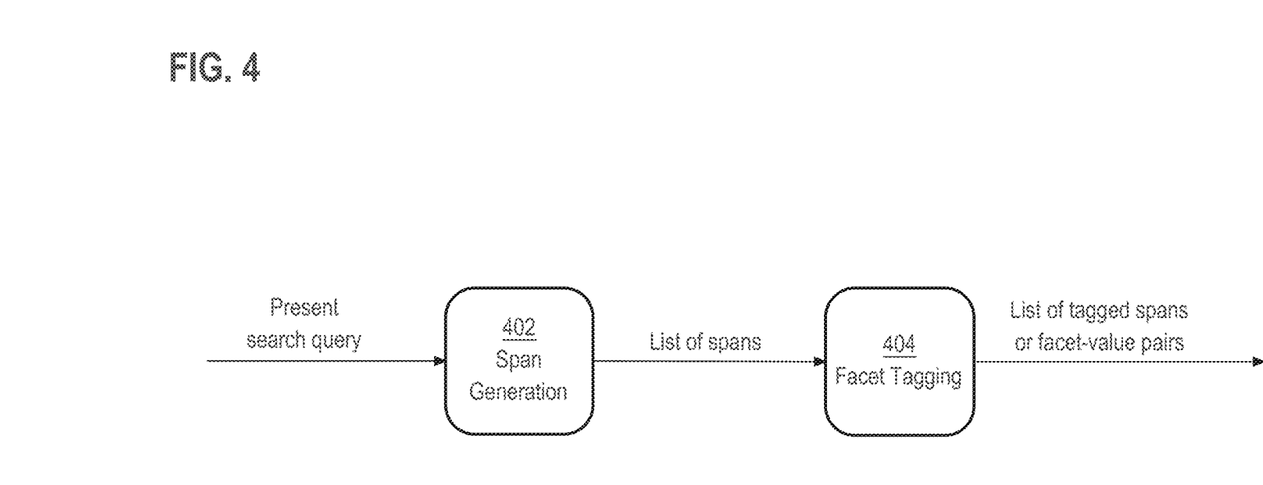
FIG. 4 illustrates an example facet tagging model applied by the conversational search server.

FIG. 4 illustrates an example facet tagging model applied by the conversational search server. In some embodiments, the server 102 is programmed to generate a list of spans from a search query in an unstructured form via the span generation component 402. Each span is a contiguous portion of the search query that corresponds to a facet. Specifically, the span generation component 402 can include identifying each contiguous portion of the search query and determining the corresponding role of the contiguous portion, such as a facet. In the example given above, of the search query "Find people working at deep mind in Canada and Australia", one contiguous portion is "and", another contiguous portion is "deep", and yet another contiguous portion is "deep mind", with the last two being spans. Other roles include a facet relationship indicator, an action indicator, or a signal for starting or ending a search conversation, as further discussed below. The server 102 is programmed to next generate a list of facet-value pairs from the list of spans via the facet tagging component 404. In the example given above, the span of "deep" and the span of "deep mind" each correspond to a facet of "company", for example.

In some embodiments, the span generation component 402 and/or the facet tagging component 404 can be implemented using one or more of rule-based operators, logistic regression classifiers, recurrent, feedforward, or other types of neural networks that represent or characterize different parts of an actual or plausible unstructured query, and other computational techniques. For example, a convolutional neural network ("CNN") that performs part-of-speech-tagging may be adapted to recognize facets directly from an unstructured query. Specifically, to tag a span within a search query, the CNN may accept as input a concatenation of an embedding of the span and the embedding of the search query, which collectively encode characteristics of how the span fits in the search query, and produce as output a distribution of how likely it is that the span corresponds to each of the possible facets, with the facet associated with the highest probability assigned to the span.

In step 306, the server 102 is programmed to perform action tagging. In some embodiments, the action tagging can include executing an action tagging model that takes the search query, the first list of facet-value pairs (the value could be null for certain facets), and the context of the search query within the search conversation as input and produces a second list of facet-value pairs that is meaningful with respect to the previous search queries in the search conversation as output. The context can include a series of search queries, each except for the first one made after a search result in response to the previous search query is returned, the lists of facet-value pairs for each of the search queries, or the search result in response to each of the search queries. The search result can be used to determine whether the facets corresponding to the last search query were coherent, for instance, as further discussed below. Specifically, the server 102 is programmed to convert the first list of facet-value pairs to the second list of facet-value pairs to ensure an appropriate level of information content. Such conversion to the second list of facet-value pairs generally includes identifying an action, such as addition, removal, replacement, or update, for a facet-value pair in the first list or in the list of facet-value pairs corresponding to the last search query in the search conversation. Specifically, the conversion to the second list of facet-value pairs could start with the facet-value pairs in the first list and consider removing facet-value pairs or adding certain facet value pairs corresponding to the last search query, or (the other way around) start with the facet value pairs corresponding to the last search query and consider removing some facet-value pairs or adding facet value pairs from the first list.

In some embodiments, the server 102 is programmed to identify indicators for an action from the search query. Such indicator identification can borrow some operations from span generation discussed above or reuse some results of the span generation. Certain signals in a search query, such as "only", "instead of", "both", "but", or other conjunction words or phrases, often indicate specific actions. In the example given above, the word "only" can be identified from the search query "Only in Montreal" as leading to no action for a facet of "location" corresponding to the previous search query (and addition for the other facet-value pairs corresponding to the previous search query) as that facet is being overridden by the facet with an associated value of Montreal. These signals can also indicate relationships between facets, as further discussed below. In the example above, when the current search query is "In Spain as well", the signal "as well" indicates that the facet of location with an associated value of "Spain" have a conjunctive relationship with the two existing facets of location with associated values of Canada and Australia, respectively. Other signals in a search query can be verbs that directly indicate specific actions. In the example given above, a search query of "Eliminate Australia from consideration" indicates that the action should be a removal for the facet of "location" with an associated value of "Australia" in the first list.

In other embodiments, the server 102 is programmed to identify indicators for an action by considering previous search queries in the search conversation and related data. Specifically, known relationships between different facets respectively corresponding to the current search query and the previous search query in the search conversation can be taken into consideration, such as one facet (e.g. "country") being broader than another (e.g. "city"). In certain embodiments, when there is no relationship (and the facet-value pair in the first list of facet-value pairs does not correspond to the items to be looked for), the server 102 can be programmed to assign an action of addition to each of the facet-value pairs corresponding to the previous search query. When there is a relationship, the server 102 can be programmed to determine which actions to assign to the related facets depending on the nature of the relationship. In the example given above, when the search query following "Find people working at deep mind in Canada and Australia" is "Only in Montreal", there would be no action for the facet of "location" with an associated value of Canada, as the facet of "location" with an associated value of Montreal is being added. If the facet with an associated value of Canada was "country" instead, the action for the facet could be an addition, given that the facet of "city" with an associated value of Montreal is being added. In addition, some other facets corresponding to the previous search query may need to be incorporated to provide some context for the present search query. There would similarly be no action for facet of "location" with an associated value of Australia, but the action for the facet of "company" with an associated value of "Deep Mind" would be an addition.

In some embodiments, the server 102 is programmed to recognize that the present search query is unrelated to the previous search query received from the same sender, thus marking an end to an existing search conversation and a beginning to a new search conversation. The server 102 can be programmed to determine the relationship between the first list of facet-value pairs and the facet-value pairs corresponding to one or more previous search queries, especially the relationship between facets that correspond to items to be searched for. For example, when the previous search query is "Find people working at deep mind in Canada and Australia" and the present search query is "Find companies that are located in Wisconsin", the facet of "people" that corresponds to the items to be searched for in the previous search query is unrelated to the facet of "company" that corresponds to the item to be searched for in the present search query. Therefore, the present search query is deemed as starting a new search conversation. For further example, when the previous search query is "Find people working at deep mind in Canada and Australia" but the present search query is "Find people working at apple in the United States", the facet of "people" that corresponds to items to be searched for is shared. In the presence of certain signals in the present search query indicating a relationship with the previous search query, such as "now", "instead", or "start over", the present search query can also be deemed to start a new search conversation.

In some embodiment, the server 102 is programmed to next generate a list of actions for facet-value pairs from a list of facet-value pairs corresponding to the present search query, a list of facet-value pairs corresponding to the previous search query. The application of the actions leads to an updated list of facet-value pairs. In the example given above, based on a review of the list of facet-value pairs corresponding to the previous search query "Find people working at deep mind in Canada and Australia" and the first list of facet-value pairs corresponding to the present search query "Only in Montreal", it may be determined that the facet of "country" with an associated value of Canada is related to the facet of "city" with an associated value of Montreal. The action of addition may then be assigned to the facet of "country" with an associated value of Canada as the facet of "country" is broader than the facet of "city". If both facets were "location" instead, no action may be assigned to the facet with an associated value of Canada. The signal of "only" in the search query is used to further indicate the relationship between the facet with an associated value of Canada and the facet with an associated value of Montreal. If the signal had been "except for" instead of "only", for instance, the facet with an associated value of Montreal would need to be associated with a negative operator (e.g., "not"), and the facet with an associated value of Canada would need to be added, or alternatively the facet with an associated value of Montreal would need to be removed and a facet with an associated value of all cities in Canada except for Montreal would need to be added. When the present search query is "Find companies that are located in Wisconsin" instead, the last search conversation would be terminated, a new search conversation would be started with reinitialized context information.

In some embodiments, the action tagging model can be trained using sequences of search queries in search histories, sequences of synthetic natural-language queries derived from sequences of lists of facet-value pairs corresponding to the sequences of prior search queries or input separately, or sequences of other actual or plausible unstructured queries, as well as the corresponding lists of facet-value pairs in the sequences, which correspond to the model input. The action tagging model can be further trained with certain lists of facet-value pairs with associated action labels that can be derived from those sequences of unstructured queries and the corresponding lists of facet-value pairs, which correspond to the model output. The training or execution of the action tagging model can utilize the initially computed embeddings to represent the unstructured queries or facet-value pairs. As more sequences of unstructured queries and corresponding facet-value pairs and action labels become available, the action tagging model can be retrained. Such retraining can occur periodically, upon specific request, or when the number of new search sequences of unstructured queries and corresponding facet-value pairs and action labels available reaches a certain threshold. Action tagging can be implemented using one or more of rule-based operators, recurrent, feed forward, or other types of neural networks that represent or characterize different relationships between actual or plausible facet-value pairs, and other computational techniques. For example, a feed forward neural network may accept as input a concatenation of an embedding of a facet-value pair to be classified, which can belong to the first list or correspond to the last search query, and the embedding of the search query, which collectively encode characteristics of how the facet-value pair is related to the search query, and produce as output a distribution of how likely it is that the facet-value pair is subject to each of the possible actions, with the action associated with the highest probability assigned to the facet-value pair.

Figure 5:
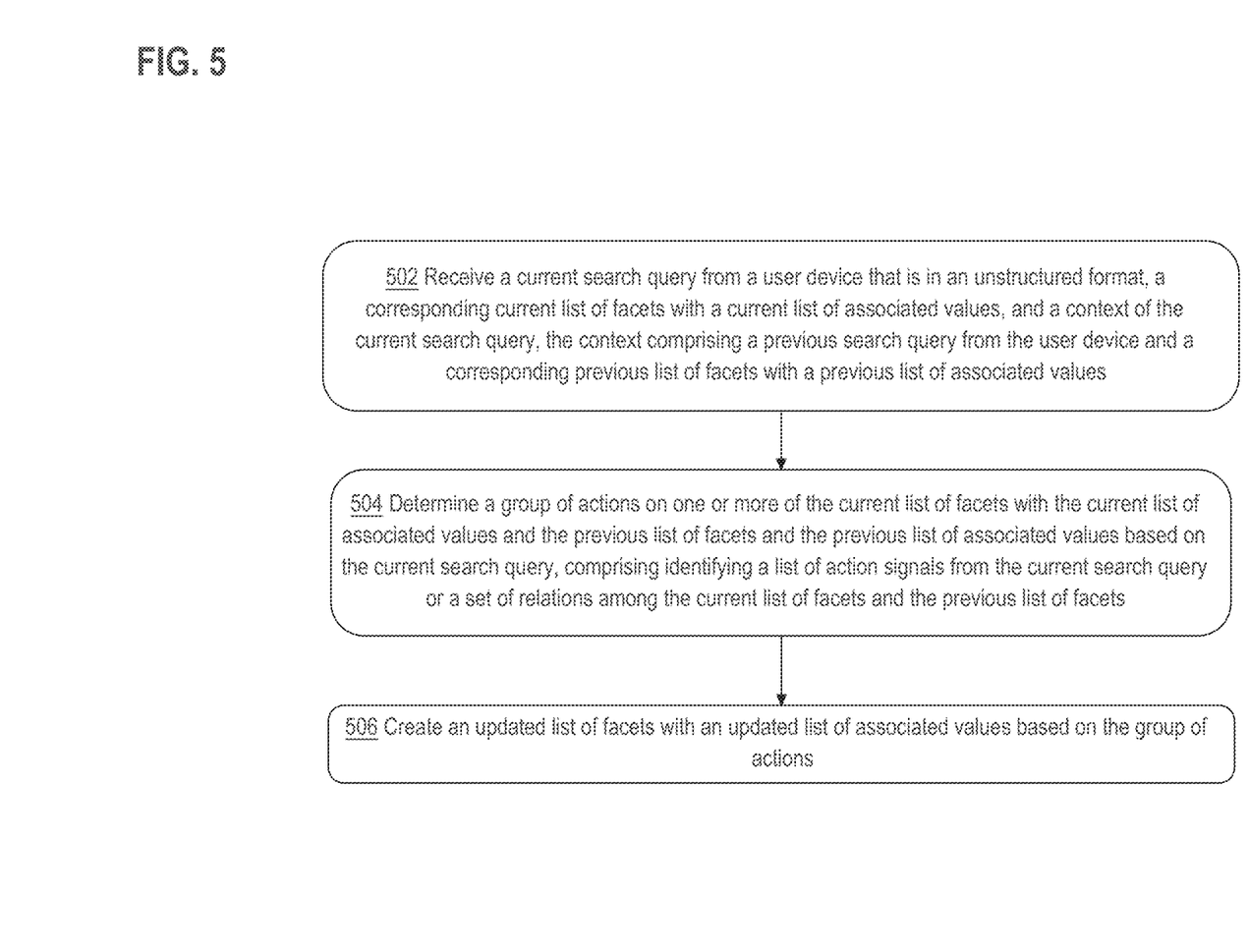
FIG. 5 illustrates an example action tagging process performed by the conversational search server.

FIG. 5 illustrates an example action tagging process performed by the conversational search server. In some embodiments, in step 502, the server 102 is programmed to receive a current search query provided by a user device that is in an unstructured format, a corresponding current list of facets with a current list of associated values, and a context of the current search query. The context may comprise at least one previous search query from the user device and a corresponding previous list of facets with a previous list of associated values. When the current search query extends a current search conversation, the context may comprise a series of previous search queries from the user device and related data in the current search conversation.

In step 504, the server 102 is programmed to determine a group of actions on one or more of the current list of facets with the current list of associated values and the previous list of facets and the previous list of associated values based on the current search query. In such determination, the server 102 can be configured to identify a list of action signals from the current search query, such as conjunctions or verbs, which may describe Boolean relations among facets with their associated values or specify actions on facets with their associated values. The server 102 can also be configured to identify a set of known, scope-based relations specifically among the current list of facets and the previous list of facets, such as one facet of "country" being broader than another facet of "city".

In step 506, the server 102 is programmed then to create an updated list of facets with an updated list of associated values based on the group of actions. For example, the group of actions may be to start with the current list of facets with the current list of associated values, add the previous list of facets with the previous list of associated values subject to appropriate Boolean relations, and for each of the previous list of facets that is related to one of the current list of facets scope-wise, remove, replace, or update that facet with its associated value. Applying the group of actions then leads to the updated list of facets with the updated list of associated values, from which a database query can ultimately be created and executed to generate search results in response to the current search query.

In step 308, the server 102 is programmed to perform coherence scoring. In some embodiments, the coherence scoring can include executing a coherence scoring model that takes the second (or the first) list of facet-value pairs (the value could be null for certain facets) as input and produces a third list of facet-value pairs having a high coherence score as output. Specifically, the server 102 is programmed to convert the second list of facet-value pairs to the third list of facet-value pairs to maximize a coherence score —the likelihood that the facet-value pairs lead to a meaningful search. Such meaningfulness can be measured against search histories, search logs, the core databases, and other sources of facts. Generally, a search that returns an empty search result is not considered meaningful, while a search based on facet-value pairs that have appeared frequently in the search logs may be considered meaningful. In the example given above, the server 102 can be programmed to recognize that inclusion of the facet of "location" with an associated value of "Australia" will lead to an empty search result because the company Deep Mind does not have any office in Australia. The server 102 might also be programmed to recognize that while other companies exist that have offices in both Canada and Australia, the facet of "company" is associated with a larger weight than the facet of "location" or that the search for people working in Deep Mind's Canada office is associated with a higher interest among users.

In some embodiments, the coherence scoring model can be trained using search logs as well as search log derivatives obtained from randomly perturbing portions of the search logs or input separately, or other actual or plausible lists of facet-value values, which correspond to the model input. The coherence scoring model can be further trained with associated coherence scores, which correspond to the model output. The training or execution of the coherence scoring model can utilize the initially computed embeddings to represent the facet-value pairs. As more lists of facet-value pairs and corresponding coherence scores become available, the coherence scoring model can be retrained. Such retraining can occur periodically, upon specific request, or when the number of new search queries available reaches a certain threshold.

Specifically, in training the coherence scoring model, each of a group of lists of facet-value pairs from the search logs or otherwise corresponding to actual or plausible unstructured queries can be assigned a high coherence score. Each of the lists of facet-value pairs can then be converted to one or more lists of facet-value pairs that are then each assigned a low coherence score for deviating from an actual or plausible unstructured query. The conversion can involve randomly replacing or updating one of the facet-value pairs, or adding a new facet-value pair, for example. The nature of the conversion can determine the value of the coherence score. A random change typically leads to a new list of facet-value pairs that does not correspond to any actual unstructured query, and so the new list can be assigned a lower coherence value. When the new list of facet-value pairs also does not correspond to a plausible unstructured query based on other sources of data, such as the core databases or certain dictionaries, then the new list can be assigned an even lower coherence score. For example, given a list of facet-value pairs, including a facet of "company" with an associated value of Deep Mind and a facet of "location" with an associated value of Montreal, some perturbations include changing Deep Mind to Deep Soul, replacing the facet of "location" with an associated value of Montreal by a facet of "function" and an associated value of sale, or adding a facet of "color" with an associated value of red. The facet of "color" with an associated value of red may be considered especially incoherent with the original list of facet value pairs.

In other embodiments, the server 102 is programmed to perform coherence scoring before action tagging, or perform coherence scoring repeatedly, such as after facet tagging and action tagging.

Figure 6:
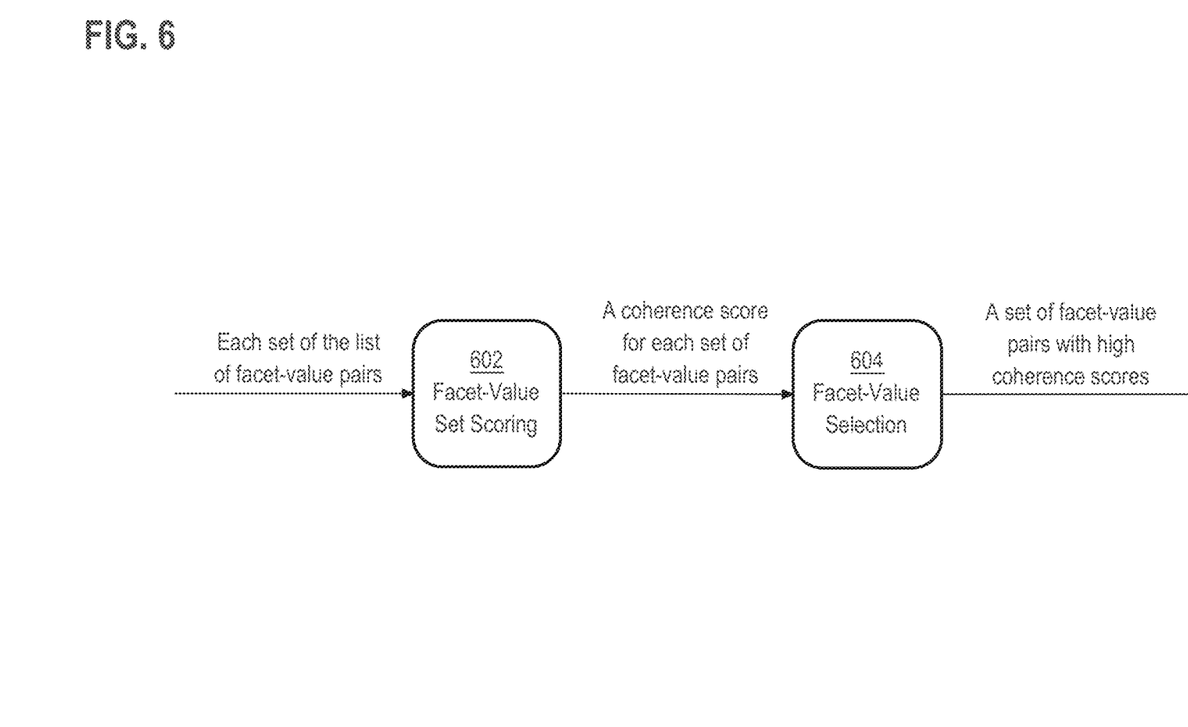
FIG. 6 illustrates an example coherence scoring model applied by the conversational search server.

FIG. 6 illustrates an example coherence scoring model applied by the conversational search server. In some embodiments, the server 102 is programmed to compute a coherence score for each subset of a list of facet-value pairs via the facet-value set scoring component 602. As the computation for substantially all possible subsets of the list of facet-value pairs generally satisfies the overlapping subprogram or substructure property, it can be performed via dynamic programming. Alternatively, the server 102 can be programmed to compute a coherence score for select subsets of the list of facet-value pairs using beam search or other heuristic search algorithms. The server 102 is further programmed to select one or more subsets of facet-value pairs for downstream processing based on the coherence scores via the facet-value selection component 604. The server 102 can be programmed to select a fixed number or percentage of highest-scoring subsets of facet-value pairs, select those subsets of facet-value pairs with their coherence scores above a fixed threshold, or use other related techniques.

In some embodiments, the facet-value set scoring component 602 and/or the facet-value selection component 604 can be implemented using one or more of rule-based operators, logistic regression classifiers, recurrent, feedforward, or other types of neural networks that represent or characterize a list of facet-value pairs corresponding to an actual or plausible unstructured query, and other computational techniques.

In step 310, the server 102 is programmed to formulate a database query. For example, the formulation of a SQL query can involve creating a select clause for the facet without an associated value and a wherein clause for each facet having an associated value. In some embodiments, the server 102 can also be programmed to keep track of the relationships among the different facets during facet tagging, action tagging, coherence scoring, or other processing, which would then be translated into relationship operators in the database query. More specifically, typical words or phrases that indicate Boolean relationships in the search query can be taken as indicators for relationships between facets. Some examples of such words or phrases are "and", "or", "as well", "except", "but", "not", "additional", and "together with". The relationships between search queries can also be taken as such indicators. For example, typically, the facet-value pairs added based on previous search queries are to be considered conjunctively with the facet-value pairs in the present search query. The server 102 is programmed to further submit the database query to the database search engine 126 for execution against the core databases. In step 312, the server 102 is programmed to receive the search result of the database query. In other embodiments, the server 102 is programmed to transmit the search result to the user search manager 124, which can be programmed to cause display of the search result.

In addition, the server 102 can be programmed to perform facet prediction. In some embodiments, the facet prediction can include executing a facet prediction model that takes as input one or more search queries in the search conversation and produces as output one or more facets with associated values (which can be null) to include in the next search query in the search conversation. The generation or selection of one or more facets with associated values can be based on search logs of facet-value pairs corresponding to prior search queries, relationships among entities captured in the core databases, or other data sources.

In the example given above, given the search queries received so far in the search conversation are "Find people working at deep mind in Canada and Australia" and "Only in Montreal", the server 102 can be programmed to suggest referring to a facet of "location" with a value of "Vancouver" in the next search query because a search query that refers to a facet of "location" with an associated value of "Vancouver" is often received after a search query similar to "Only in Montreal" due to the small number of people in the Montreal office, the fact that employees often move between the two offices, etc. The server 102 can also be programmed to suggest referring to a facet of "building" in the next search query (without a suggestion for an associated value) because there are many buildings in the Montreal office and generally a facet of "building" is referenced early on a search conversation in search conversations.

In some embodiments, the server 102 is programmed to utilize the result of coherence scoring in facet prediction. For example, instead of removing a facet because it appears incoherent with the rest of the facets, the server 102 can be programmed to keep that facet in building a database query for the present search query but suggest removing the facet in the next search query. Similarly, the server 102 can take into consideration the quality of the search result in facet prediction. When the quality of the search result is low because the database match score is low or the number of hits is too large or too small, the server 102 can be programmed to assist the user with improving the quality of the search result by eliminating incoherent facet-value pairs, or adding or removing facet-value pairs to broaden or narrow the scope of the search. In other embodiments, the server 102 is programmed to provide an explanation for the suggestion of a facet. Therefore, the user computer 122 can receive not only a suggestion for a facet-value pair to be included in the next search query but also the reason for such inclusion.

In some embodiments, the server 102 is programmed to incorporate user input into facet prediction. Specifically, the server 102 is programmed to initially produce several candidate facets for inclusion in the next search query and cause display of the several candidate facets for user selection. Alternatively, the server 102 can be programmed to convert each of those candidate facets into a corresponding natural-language query and cause display of those natural-language queries. Furthermore, the server 102 is programmed to then take the user's selection, construct a full list of facet-value pairs, convert it into a database query, and carry the search conversation forward. Such facet prediction further reduces the need to display any large number of facets or saves both computer resources and human efforts.

In some embodiments, the facet prediction model can be trained using search logs of lists of facet-value pairs corresponding to search queries in prior search conversations or sequences of other actual of plausible unstructured queries, which correspond to the model input. The facet prediction model can be further trained with additional facet-value pairs in subsequent search queries in those prior search conversations or subsequent unstructured queries in those sequences of unstructured queries, which correspond to the model output. The training or execution of the facet prediction model can utilize the initially computed embeddings to represent the facet-value pairs. As more search logs or lists of facet-value pairs become available, the facet prediction model can be retrained. Such retraining can occur periodically, upon specific request, or when the number of new lists of facet-value pairs available reaches a certain threshold.

In some embodiments, the facet prediction model can be implemented using one or more of rule-based operations, recurrent or other types of neural networks that represent or characterize a series of lists of facet-value pairs corresponding to a series of search queries in a search conversation or a sequence of actual or plausible unstructured queries, and other computational techniques for text generation. For example, a rule-based approach can be used to generate one or more new facet-value pairs given the facet-value pairs corresponding to the last search query. More broadly, a recurrent neural network (RNN) with long short-term memory (LSTM) units can be used to generate one or more new facet-value pairs given a list of facet-value pairs corresponding to previous search queries received so far in the search conversation.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
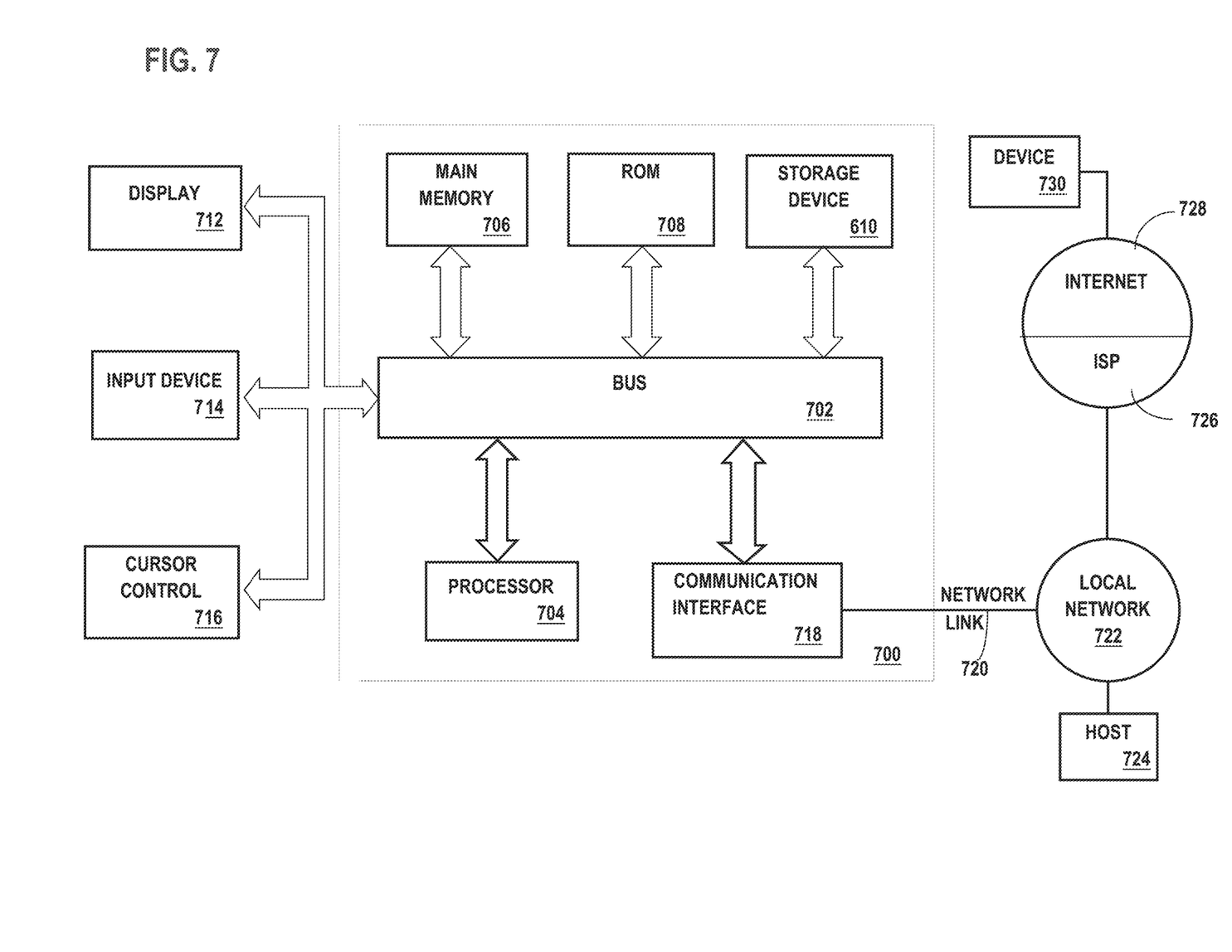
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving a search query that is part of a search conversation, the search query in an unstructured format,
    the search conversation including one or more previous, successive search queries from a user device and one or more results of the one or more previous search queries,
    each of the one or more previous search queries except for the first search query submitted in response to the result to the previous search query;
  identifying a first list of facets of possible facets with a first list of associated values from the search query, each associated value of the first list of associated values being part of the search query, comprising:
  generating as input data a concatenation of an embedding of a portion of the search query and an embedding of the search query;
  sending the input data to a neural network that generates as output data a distribution of a likelihood that the portion of the search query corresponds to each of the possible facets; and
  assigning a facet of the possible facets having a highest likelihood in the distribution based on the output data to the portion of the search query;
  determining one or more actions performed for the first list of facets based on a context of the search query within the search conversation,
    the context including one or more previous search queries in the search conversation with the user device, lists of facet-value pairs for each of the one or more previous search queries, or the search result in response to each of the one or more previous search queries,
    the one or more actions including an update for a facet to update an associated value;
  performing the one or more actions on the first list of facets to derive a second list of facets with a second list of associated values;
  generating a database query based on the second list of facets with the second list of associated values;
  causing a database search with the database query;
  transmitting a search result of the database search to the user device, wherein the method is performed by one or more computing devices.

2. The method of claim 1, the unstructured format including a natural language sentence or phrase.

3. The method of claim 1,
the first list of facets corresponding to words or phrases within the search query,
the first list of facets being a subset of a set of facets that correspond to database fields.

4. The method of claim 1, further comprising
selecting a third list of facets with a third list of associated values from the second list of associated values, the third list of facets having a coherence score above a threshold,
the coherence score indicating a likelihood of the third list of facets appearing together in any search query based on a group of facts or prior search queries,
generating the database query being further based on the third list of facets with the third list of associated values.

5. The method of claim 1, further comprising predicting a facet to be included in the next search query in the search conversation with the user device.

6. The method of claim 5, the predicting being based on the context of the search query or a search history of prior search queries in prior search conversations.

7. The method of claim 5, further comprising transmitting the predicted facet to the user device.

8. The method of claim 1, the one or more actions further including addition and removal.

9. One or more non-transitory storage media storing instructions which, when executed by one or more computing devices, cause performance of a method, the method comprising:
receiving a search query that is part of a search conversation, the search query in an unstructured format,
the search conversation including one or more previous, successive search queries from a user device and one or more results of the one or more previous search queries,
each of the one or more search queries except for the first search query submitted in response to the result to the previous search query;
identifying a first list of facets of possible facets with a first list of associated values from the search query, each associated value of the first list of associated values being part of the search query, comprising:
comprising:
generating as input data a concatenation of an embedding of a portion of the search query and an embedding of the search query;
sending the input data to a neural network that generates as output data a distribution of a likelihood that the portion of the search query corresponds to each of the possible facets; and
assigning a facet of the possible facets having a highest likelihood in the distribution based on the output data to the portion of the search query;

determining one or more actions performed for the first list of facts based on a context of the search query within the search conversation,
the context including the one or more previous search queries in the search conversation with the user device, lists of facet-value pairs for each of the one or more previous search queries, or the search result in response to each of the one or more previous search queries,
the one or more actions including an update for a facet to update an associated value;
performing the one or more actions on the first list of facets to derive a second list of facets with a second list of associated values;
generating a database query based on the second list of facets with the second list of associated values;
causing a database search with the database query;
transmitting a search result of the database search to the user device.

10. The one or more non-transitory storage media of claim 9, the unstructured format including a natural language sentence or phrase.

11. The one or more non-transitory storage media of claim 9,
the first list of facets corresponding to words or phrases within the search query,
the first list of facets being a subset of a set of facets that correspond to database fields.

12. The one or more non-transitory storage media of claim 9, the method further comprising predicting a facet to be included in the next search query in the search conversation with the user device.

13. The one or more non-transitory storage media of claim 12, the predicting being based on the context of the search query or a search history of prior search queries in prior search conversations.

14. The one or more non-transitory storage media of claim 12, the method further comprising transmitting the predicted facet to the user device.

15. The one or more non-transitory storage media of claim 9, the deriving comprising determining one or more actions performed for each of the first list of facets.

16. The one or more non-transitory storage media of claim 15, the action being an addition, removal, or update.

17. The one or more non-transitory storage media of claim 9, further comprising
selecting a third list of facets with a third list of associated values from the second list of facets with the second list of associated values, the third list of facets having a coherence score above a threshold,
the coherence score indicating a likelihood of the third list of facets appearing together in any search query based on a group of facts and prior search queries,
generating a database query based on the second list of facets with the second list of associated values and the third list of facets with the third list of associated values.

* * * * *